US010489525B2

United States Patent
Joshi et al.

(10) Patent No.: US 10,489,525 B2
(45) Date of Patent: Nov. 26, 2019

(54) SYSTEMS AND METHODS FOR COMPOSITE THERMAL INTERFACE MATERIAL MICROSTRUCTURE PROPERTY PREDICTION

(71) Applicant: Toyota Motor Engineering & Manufacturing North America, Inc., Erlanger, KY (US)

(72) Inventors: Shailesh N. Joshi, Ann Arbor, MI (US); Masao Noguchi, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 469 days.

(21) Appl. No.: 15/045,934

(22) Filed: Feb. 17, 2016

(65) Prior Publication Data
US 2017/0235852 A1    Aug. 17, 2017

(51) Int. Cl.
G06F 17/50    (2006.01)
G06F 11/00    (2006.01)

(52) U.S. Cl.
CPC ...... *G06F 17/5009* (2013.01); *G06F 17/5018* (2013.01); *G06F 11/008* (2013.01); *G06F 2217/44* (2013.01); *G06F 2217/80* (2013.01)

(58) Field of Classification Search
None
See application file for complete search history.

(56) References Cited

U.S. PATENT DOCUMENTS

| 4,987,035 | A | 1/1991 | Miller et al. |
| 5,121,329 | A * | 6/1992 | Crump ............... B22F 3/115 228/180.5 |
| 6,471,800 | B2 * | 10/2002 | Jang ............... B29C 64/165 156/155 |
| 7,085,699 | B2 | 8/2006 | Variyam |
| 7,917,243 | B2 * | 3/2011 | Kozlak ............... G06F 17/50 264/512 |
| 8,229,717 | B2 | 7/2012 | Rodriguez et al. |

(Continued)

FOREIGN PATENT DOCUMENTS

WO    2014160134    10/2014

*Primary Examiner* — Kibrom K Gebresilassie
(74) *Attorney, Agent, or Firm* — Dinsmore & Shohl LLP (57) ABSTRACT

Systems and methods of simulating a physical bond layer comprising a composite material and predicting one or more properties of the composite material are disclosed. A method includes obtaining one or more X-ray images of a bulk physical sample of a composite material, the one or more X-ray images including one or more visual identifiers that correspond to one or more materials present in the bulk physical sample, and generating a three dimensional image of the bulk physical sample from the one or more X-ray images. The three dimensional image includes one or more labels indicating the presence and location of the one or more materials. The method further includes creating a meshed three dimensional microstructure-based model from the three dimensional image and simulating a physical bond layer with the meshed three dimensional microstructure-based model. The meshed three dimensional microstructure-based model incorporates data obtained from the one or more labels.

20 Claims, 10 Drawing Sheets

(56) References Cited

U.S. PATENT DOCUMENTS

| | | | |
|---|---|---|---|
| 8,290,753 B2 | 10/2012 | Tryon, III et al. | |
| 8,401,829 B2* | 3/2013 | Fertig | G06F 17/5018 703/1 |
| 8,858,856 B2* | 10/2014 | Kozlak | B29C 64/35 264/259 |
| 9,223,914 B2* | 12/2015 | Fertig | G06F 17/5018 |
| 9,315,663 B2* | 4/2016 | Appleby | C08L 63/00 |
| 9,738,031 B2* | 8/2017 | Mikulak | B29C 64/118 |
| 9,776,376 B2* | 10/2017 | Swartz | B32B 5/26 |
| 9,833,949 B2* | 12/2017 | Swartz | B29C 64/153 |
| 2002/0016686 A1* | 2/2002 | Kennefick | G06F 17/5009 702/42 |
| 2002/0167101 A1* | 11/2002 | Tochimoto | B29C 41/36 264/40.1 |
| 2005/0126676 A1* | 6/2005 | Karlsson | B32B 37/24 156/39 |
| 2007/0061080 A1* | 3/2007 | Zhdanov | G01V 3/12 702/7 |
| 2007/0106418 A1* | 5/2007 | Hagen | B29C 70/386 700/186 |
| 2009/0085437 A1* | 4/2009 | Cole | F16F 15/005 310/326 |
| 2009/0321979 A1* | 12/2009 | Hiraide | B33Y 10/00 264/113 |
| 2009/0326883 A1* | 12/2009 | Mizutani | G06F 17/5018 703/2 |
| 2011/0181701 A1* | 7/2011 | Varslot | G06T 7/30 348/46 |
| 2011/0215331 A1* | 9/2011 | Yamazaki | H01L 21/02554 257/60 |
| 2013/0166256 A1* | 6/2013 | Wirx-Speetjens | G06F 17/50 703/1 |
| 2016/0096318 A1* | 4/2016 | Bickel | B29C 67/0051 264/40.1 |
| 2016/0236415 A1* | 8/2016 | Rothenberg | G05B 19/4099 |
| 2016/0236417 A1* | 8/2016 | Rothenberg | G05B 19/4099 |
| 2017/0154141 A1* | 6/2017 | Tranquart | G06F 17/5018 |
| 2018/0319087 A1* | 11/2018 | Eom | B29C 64/393 |

* cited by examiner

SYSTEMS AND METHODS FOR COMPOSITE THERMAL INTERFACE MATERIAL MICROSTRUCTURE PROPERTY PREDICTION

TECHNICAL FIELD

The present specification generally relates to evaluating a bond layer between substrate layers in semiconductor devices and, more specifically, to imaging a bulk amount of bond layer material to create a 3D model for evaluating a potential bond layer comprised of the bond layer material.

BACKGROUND

In power electronics assemblies, a semiconductor device may be bonded to a substrate via a bond layer. Before implementing a bond layer of a certain composition resulting from certain process parameters, the bond layer must be thoroughly tested for thermal and mechanical properties. It can be very difficult and time consuming to create a physical bond layer for testing purposes.

Accordingly, a need exists for systems and methods that reduce the need to create physical samples and reduce the time and expense needed to evaluate different bond layer compositions and process parameters.

SUMMARY

In one embodiment, a method of simulating a physical bond layer having a composite material includes obtaining one or more X-ray images of a bulk physical sample of the composite material, the one or more X-ray images including one or more visual identifiers that correspond to one or more materials present in the bulk physical sample, and generating a three dimensional image of the bulk physical sample from the one or more X-ray images. The three dimensional image includes one or more labels indicating the presence and location of the one or more materials. The method further includes creating a meshed three dimensional microstructure-based model from the three dimensional image and simulating a physical bond layer with the meshed three dimensional microstructure-based model. The meshed three dimensional microstructure-based model incorporates data obtained from the one or more labels.

In another embodiment, a system for simulating a physical bond layer having a composite material includes a processing device and a non-transitory, processor readable storage medium. The non-transitory, processor readable storage medium includes one or more programming instructions stored thereon that, when executed by the processing device, cause the processing device to obtain one or more X-ray images of a bulk physical sample of the composite material, the one or more X-ray images including one or more visual identifiers that correspond to one or more materials present in the bulk physical sample, and generate a three dimensional image of the bulk physical sample from the one or more X-ray images. The three dimensional image includes one or more labels indicating the presence and location of the one or more materials. The programming instructions, when executed, further cause the processing device to create a meshed three dimensional microstructure-based model from the three dimensional image and simulate a physical bond layer with the meshed three dimensional microstructure-based model. The meshed three dimensional microstructure-based model incorporates data obtained from the one or more labels.

In yet another embodiment, a method for predicting one or more properties of a composite material includes creating a bulk physical sample of the composite material, arranging the bulk physical sample at an X-ray machine such that the X-ray machine generates one or more X-ray images of the bulk physical sample, the one or more X-ray images including one or more visual identifiers that correspond to one or more materials present in the bulk physical sample, and generating a three dimensional image of the bulk physical sample from the one or more X-ray images. The three dimensional image includes one or more labels indicating the presence and location of the one or more materials. The method further includes creating a meshed three dimensional microstructure-based model from the three dimensional image, simulating a physical bond layer with the meshed three dimensional microstructure-based model, predicting the one or more properties of the composite material with the simulated physical bond layer, and optimizing the physical bond layer for a particular application by manipulating the meshed three dimensional microstructure-based model to obtain particular properties of the physical bond layer. The meshed three dimensional microstructure-based model incorporates data obtained from the one or more labels.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to systems and methods for simulating a physical bond layer from X-ray images of an amount of bulk material to test for thermal and mechanical properties. The systems and methods described herein generally include creating the bulk amount of material, obtaining X-ray images of the bulk material, creating a meshed three dimensional (3D) microstructure model based on the X-ray images, and simulating a bond layer with the model. The results of the simulation can be compared with an actual physical sample to ensure the accuracy of the simulation. In addition, an optimization process can be used to optimize the physical sample to match one or more desired constraints. Various embodiments of systems and methods for simulating a physical bond layer are described below.

Figure 1:
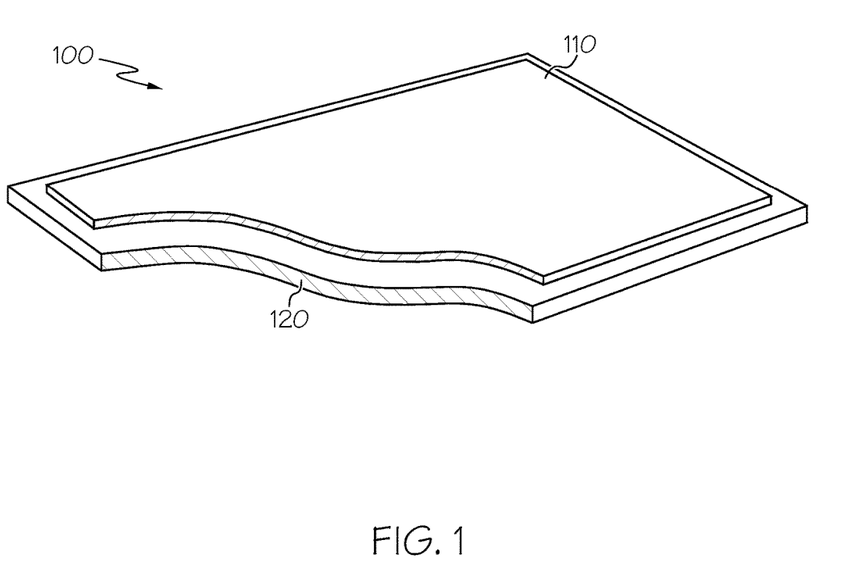
FIG. 1 schematically depicts a cutaway view of an illustrative power electronics substrate having an electronic device bonded thereto according to one or more embodiments shown and described herein.
Figure 2:
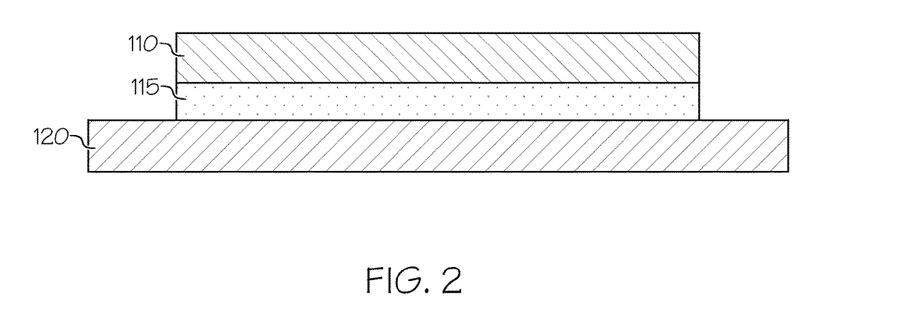
FIG. 2 schematically depicts a cross sectional view of the power electronics substrate and electronic device of FIG. 1.

Electronic devices, such as semiconductor devices and/or the like, can be joined to various components via one or more bond layers, particularly in power electronics applications. For example, an electronic device may be bonded to a substrate. One such illustrative bonding of an electronic device is depicted in FIGS. 1 and 2, which show a metal-ceramic-metal substrate, such as a direct bonded copper (DBC) substrate, bound to an electronic device. As shown in FIG. 1, an assembly 100 may include an electronic device 110 bound to a substrate 120. While not shown in FIG. 1, the substrate 120 may include a first copper layer, a second copper layer, and a ceramic layer and may further be arranged such that the ceramic layer is sandwiched between the first copper layer and the second copper layer. Other materials used for the substrate 120 are contemplated and may be used without departing from the scope of the present disclosure.

As used herein, an "electronic device" generally refers to any manufactured electronic device, such as, but not limited to, a semiconductor device, an integrated circuit (IC), one or more electronic circuits, a system on a chip (SoC), or the like. As used herein, a semiconductor device refers to an electronic component that exploits the electronic properties of semiconductor materials, such as, without limitation, silicon, germanium, gallium arsenide (GaAs), silicon carbide (SiC), and organic materials. A semiconductor device as used herein is not limited to a particular type, and may include for example, a chip (i.e., a die) or the like that contains circuit elements contained within a package, and/or the like. In some embodiments, a semiconductor device may include a bipolar junction transistor, such as a metal-oxide-semiconductor field-effect transistor (MOSFET) or an insulated gate bipolar transistor (IGBT). As used herein, an integrated circuit is an electromechanical assembly that is configured to completely enclose an integrated circuit die, and which includes a plurality of electrical conductors that carry signals to and from the die. In a multichip integrated circuit package, several die may be enclosed. As used herein, a system on a chip refers to an IC or the like that integrates one or more computing components (e.g., a processing device, memory, a memory controller, input/output interface, and/or the like) into a single chip. Other electronic devices not specifically disclosed herein (including those now known or later developed) are contemplated and possible.

Referring now to FIG. 2, in some embodiments, the electronic device 110 may be bound to the substrate 120 via a bond layer 115. That is, the bond layer 115 may be situated between the electronic device 110 and the substrate 120. The bond layer 115 may be comprised of a bond layer material, particularly a material that is suited for bonding components of power electronics devices together. A bond layer may generally be constructed of materials that are able to withstand high stresses, including stresses caused by lateral forces, vertical forces, longitudinal forces, torsional forces, temperature, and/or the like. Illustrative bond layers may be made of materials that include, but are not limited to, solder, and silver (Ag) sinter. Solder is generally a fusible metal alloy. Illustrative examples of solder include, but are not limited to, alloys containing tin, lead, copper, silver, bismuth, indium, zinc, cadmium, and/or antimony. Ag sinter is generally a silver containing sintering material that can be formed into a solid mass via application of heat and/or pressure.

Figure 3:
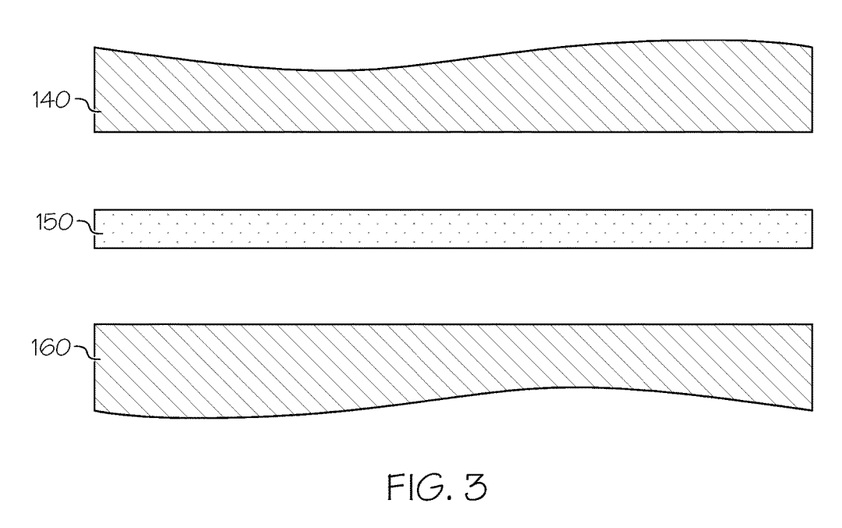
FIG. 3 schematically depicts a cross sectional exploded view of a TLP bonding configuration according to one or more embodiments shown and described herein.

In some embodiments, the bond layer 115 may be formed via transient liquid phase (TLP) bonding. TLP bonding refers to a diffusion bonding process where interlayer materials are disposed between substrate layers being bonded to form an assembly. TLP bonding allows a bond to be formed at a low temperature, while the remelting temperature of the resulting bond is much higher. When the assembly is held together and heated to the bonding temperature, at least some of the interlayer materials melt, filling in the gaps between the substrate layers. While the assembly is held at the bonding temperature, interdiffusion of certain alloying elements occurs between the interlayer and the substrates, causing a compositional change at the joint, which isothermally solidifies the joint and creates an initial bond between the substrates. Holding the assembly at the bonding temperature for a longer period of time allows a diffusion bond having a substantially homogenous microstructure to form between the substrate layers. High precision TLP bonding may be used to produce high quality chemically and microstructurally homogeneous bonds between similar or dissimilar substrate layers. TLP bonding systems and methods may use various forms of bonding medium, such as, for example, thin foils, powders, pastes, cloths, tapes, honeycombs, thin coatings, and/or the like. For example, as shown in FIG. 3, a representative TLP bonding configuration includes plurality of interlayers (e.g., thin sheets of foil) of different elements (e.g., Nickel-Tin-Nickel) that are positioned between a single crystal substrate 140 and a polycrystalline substrate 160 to form an intermetallic joint interface 150 therebetween when the components are exposed to an elevated temperature and/or an elevated pressure.

Referring again to FIG. 2, before implementing a bond layer 115 between the electronic device 110 and the substrate 120, it may be necessary to test the bond layer 115 for thermal and mechanical properties to ensure that the bond layer 115 will be effective in holding the various components together under strain. Illustrative properties that may be tested include, but are not limited to, Young's Modulus, strength, ductility, thermal conductivity, and the like. Creating physical samples for testing these various properties can be time consuming and difficult. Moreover, computer simulated testing that does not use a physical sample can be inaccurate.

Accordingly, the systems and methods described herein include creating a bulk sample that is used for testing and computer simulation that may be less time consuming, easier to conduct, and result in a more accurate simulation.

Figure 4:
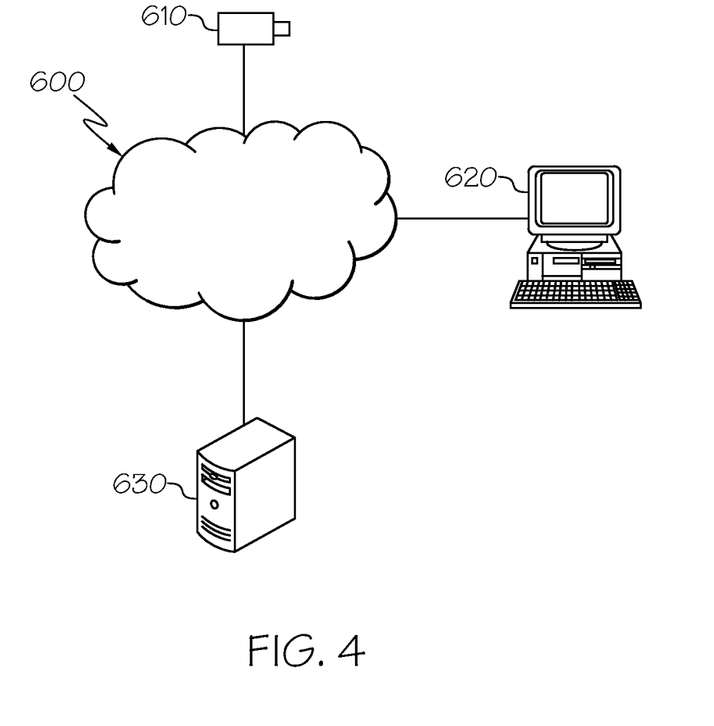
FIG. 4 schematically depicts an illustrative computing network for a system for simulating a physical bond layer according to one or more embodiments shown and described herein.

In some embodiments, at least a portion of the testing and simulation of the physical bond layer may be completed by systems that are particularly configured for such testing and simulation. FIG. 4 depicts an illustrative computer network, generally designated 600, that may be used for testing and/or simulation of the physical bond layer. As illustrated in FIG. 4, a computer network 600 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 600 may generally be configured to electronically connect one or more computing devices and/or components thereof, and/or one or more imaging devices. Illustrative computing devices may include, but are not limited to, a user computing device 620 and a server computing device 630. An illustrative imaging device 610 may include, but is not limited to, an imaging device configured to capture one or more images of a sample of bond layer material at a micro scale and/or nano scale resolution, particularly one or more X-ray images of a bulk amount of material, as described in greater detail herein.

The user computing device 620 may generally be used as an interface between a user and the other components connected to the computer network 600. Thus, the user computing device 620 may be used to perform one or more user-facing functions, such as receiving one or more inputs from a user or providing information to the user. Additionally, in the event that the server computing device 630 requires oversight, updating, or correction, the user computing device 620 may be configured to provide the desired oversight, updating, and/or correction. The user computing device 620 may also be used to input additional data into a data storage portion of the server computing device 630.

The server computing device 630 may automatically receive electronic data, X-ray images, and/or the like from one or more sources (e.g., the imaging device 610 and/or one or more databases), generate a 3D image of a sample of material, create a meshed 3D microstructure-based model from the 3D image, and/or simulate a bond layer with the meshed 3D microstructure-based model.

It should be understood that while the user computing device 620 is depicted as a personal computer and the server computing device 630 is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 4 as a single piece of hardware, this is also merely an example. More specifically, each of the user computing device 620 and the server computing device 630 may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 5A:
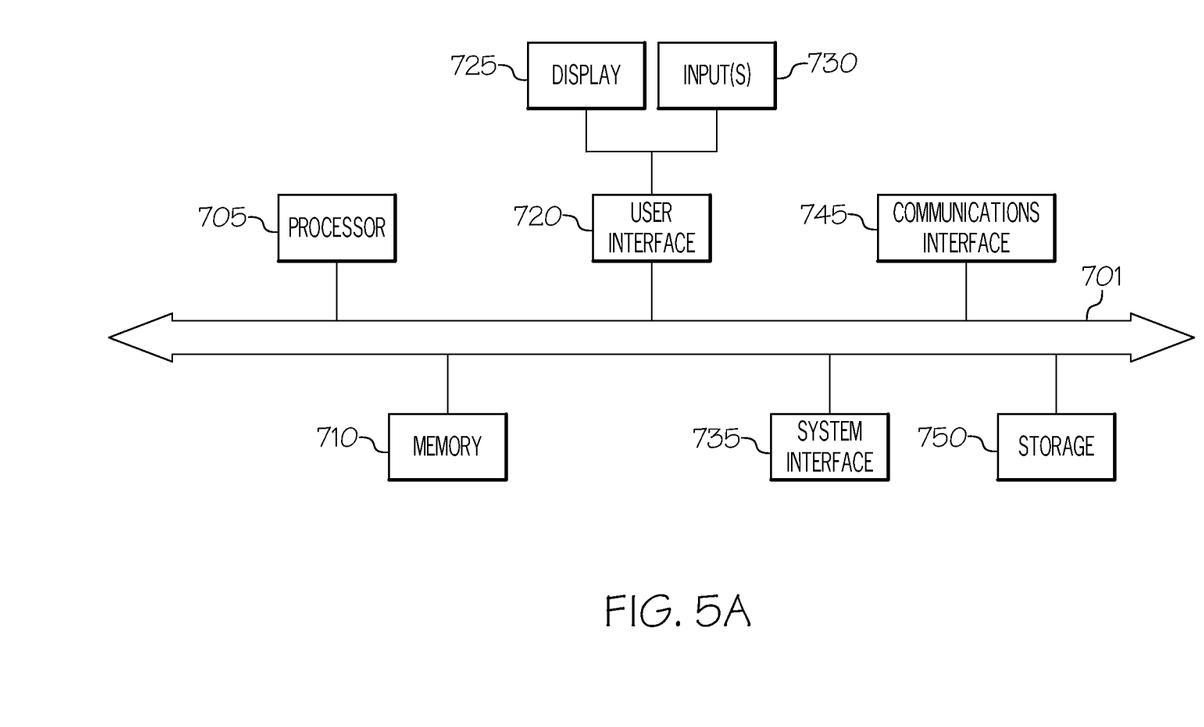
FIG. 5A schematically depicts a block diagram of illustrative hardware of a computing device that is used to simulate a physical bond layer according to one or more embodiments shown and described herein.

Illustrative hardware components of the user computing device 620 and/or the server computing device 630 are depicted in FIG. 5A. A bus 701 may interconnect the various components. A processing device 705, such as a computer processing unit (CPU), may be the central processing unit of the computing device, performing calculations and logic operations required to execute a program. The processing device 705, alone or in conjunction with one or more of the other elements disclosed in FIG. 5A, is an illustrative processing device, computing device, processor, or combination thereof, as such terms are used within this disclosure. Memory 710, such as read only memory (ROM) and random access memory (RAM), may constitute illustrative memory devices (i.e., non-transitory processor-readable storage media). Such memory 710 may include one or more programming instructions thereon that, when executed by the processing device 705, cause the processing device 705 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

Figure 5B:
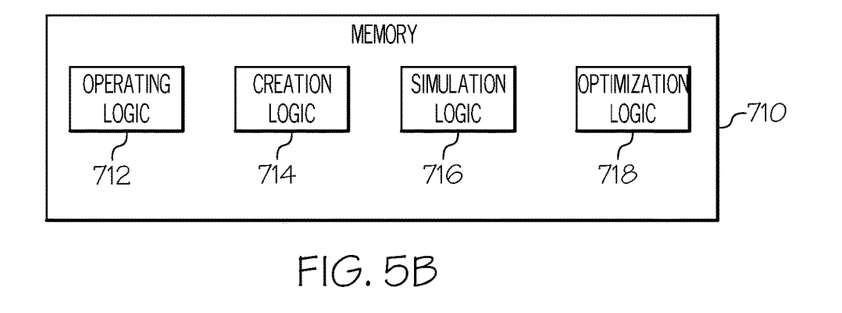
FIG. 5B schematically depicts a block diagram of software modules contained within a memory of a computing device that is used to simulate a physical bond layer according to one or more embodiments shown and described herein.

In some embodiments, the program instructions contained on the memory 710 may be embodied as a plurality of software modules, where each module provides programming instructions for completing one or more tasks. For example, as shown in FIG. 5B, the memory 710 may contain operating logic 712, creation logic 714, simulation logic 716, and/or optimization logic 718. The operating logic 712 may include an operating system and/or other software for managing components of a computing device. The creation logic 714 may include one or more software modules for creating a 3D image from X-ray images and/or creating a 3D model. The simulation logic 716 may include one or more software modules for simulating a bond layer from the 3D model. The optimization logic 718 may include one or more software modules for implementing algorithms that optimize a constituent material distribution, layout, or topology of a resulting bond layer. The optimization logic 718 may further include one or more software modules for implementing machine learning algorithms that are trained using prior material property data sets for autonomous optimization.

Referring again to FIG. 5A, a storage device 750, which may generally be a storage medium that is separate from the memory 710, may contain a data repository for storing data relating to the X-ray images, the created 3D images, and/or the 3D models, as described herein. The storage device 750 may be any physical storage medium, including, but not limited to, a hard disk drive (HDD), memory, removable storage, and/or the like. While the storage device 750 is depicted as a local device, it should be understood that the storage device 750 may be a remote storage device, such as, for example, a server computing device or the like.

Figure 5C:
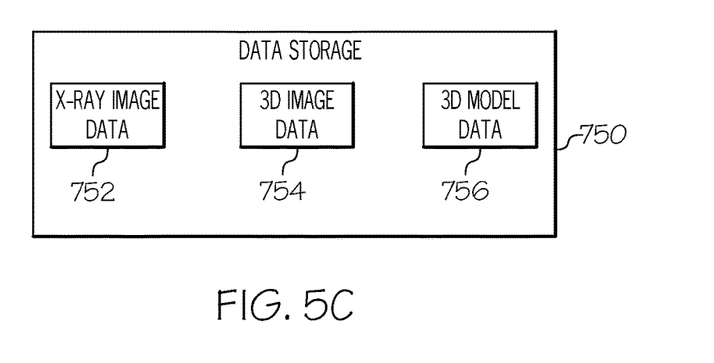
FIG. 5C schematically depicts a block diagram of various data contained within a data storage component of a computing device that is used to simulate a physical bond layer according to one or more embodiments shown and described herein.

Illustrative data that may be contained within the storage device 750 is depicted in FIG. 5C. As shown in FIG. 5C, the storage device 750 may include, for example, X-ray image data 752 (and/or other two dimensional image data), 3D image data 754, and/or 3D model data 756. The X-ray image data 752 may include, for example, images of a bulk physical sample of a composite material that are obtained from an imaging device (such as an X-ray device). The images of the bulk physical sample in the X-ray image data 752 may indicate various materials used in the bulk physical sample by distinguishing each material at a nano scale and/or micro scale resolution in a visually identifiable format with one or more visual identifiers, such as by using different colors (e.g., gray areas), shading, patterns, gradients, stippling, and/or the like, as described in greater detail herein. The 3D image data 754 may include, for example, data relating to the 3D images that are created from the X-ray images, which include labels corresponding to the various visual identifiers (e.g., gray areas), as described in greater detail herein. The 3D model data 756 may include, for example, data relating to various 3D models that are created from 3D images, such as meshed 3D microstructure-based models, as described in greater detail herein.

Referring again to FIG. 5A, an optional user interface 720 may permit information from the bus 701 to be displayed on a display 725 portion of the computing device in audio, visual, graphic, or alphanumeric format. Moreover, the user interface 720 may also include one or more inputs 730 that allow for transmission to and receipt of data from input devices such as a keyboard, a mouse, a joystick, a touch screen, a remote control, a pointing device, a video input device, an audio input device, a haptic feedback device, a coupled electronic device, and/or the like. Such a user interface 720 may be used, for example, to allow a user to interact with the computing device or any component thereof.

A system interface 735 may generally provide the computing device with an ability to interface with one or more of the components of the computer network 600 (FIG. 4), such as, for example, the imaging device 610. Communication with such components may occur using various communication ports (not shown). An illustrative communication port may be attached to a communications network, such as the Internet, an intranet, a local network, a direct connection, and/or the like.

A communications interface 745 may generally provide the computing device with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated in FIGS. 5A-5C are merely illustrative and are not intended to limit the scope of this disclosure. More specifically, while the components in FIGS. 5A-5C are illustrated as residing within the user computing device 620 or the server computing device 630, these are nonlimiting examples. In some embodiments, one or more of the components may reside external to the user computing device 620 and/or server computing device 630. Similarly, one or more of the components may be embodied in other computing devices not specifically described herein.

Figure 6:
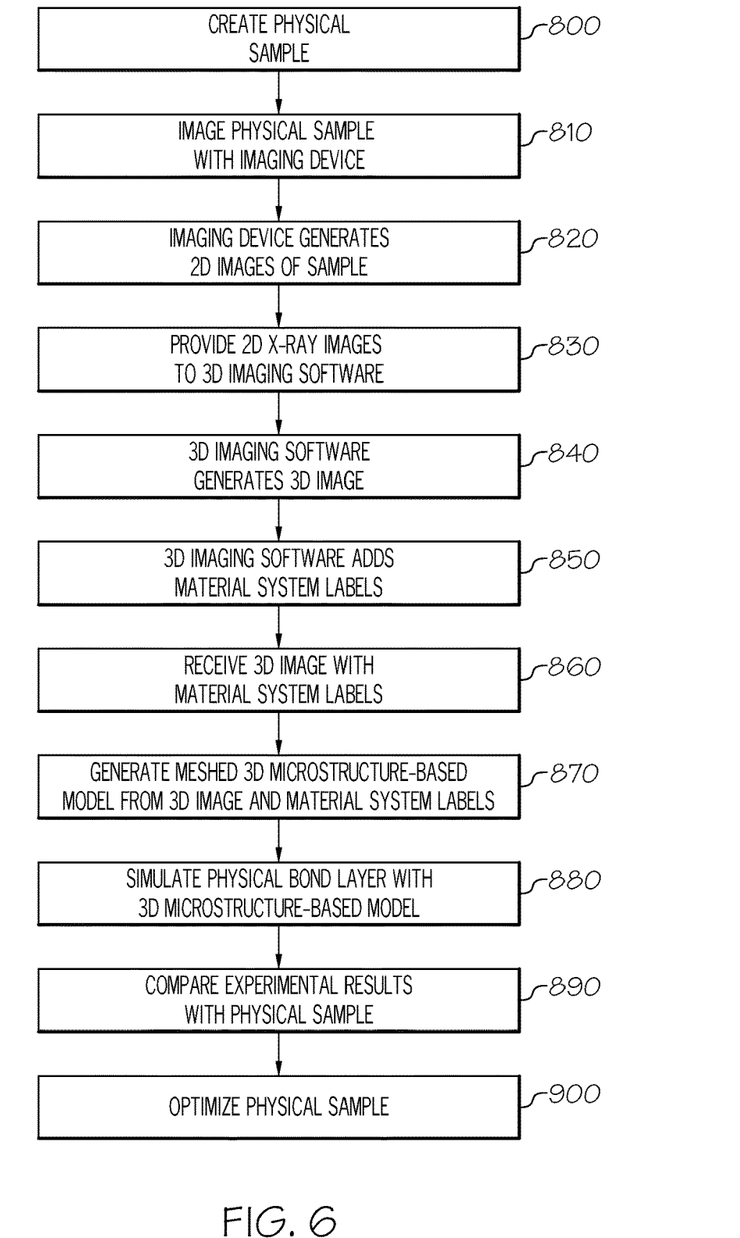
FIG. 6 depicts a flow diagram of an illustrative method predicting a microstructure of a bond layer according to one or more embodiments shown and described herein.

Referring to FIG. 6, a method of simulating a physical bond layer and/or predicting one or more properties of a composite material includes a process of creating a physical sample in step 800. The physical sample may be manually created or may be created via one or more automated steps. The physical sample may generally be a bulk amount of composite material that is usable for a bond layer between substrate layers. That is, the physical sample may be a bulk amount of solder material, Ag sinter material, material used for TLP bonding, and/or the like. The material may be created in step 800 for the purposes of simulating the physical bond layer and/or predicting one or more properties of the material. That is, the bulk material, while suitable for use as bond material, may not actually be used to bond substrate layers together.

Figure 7:
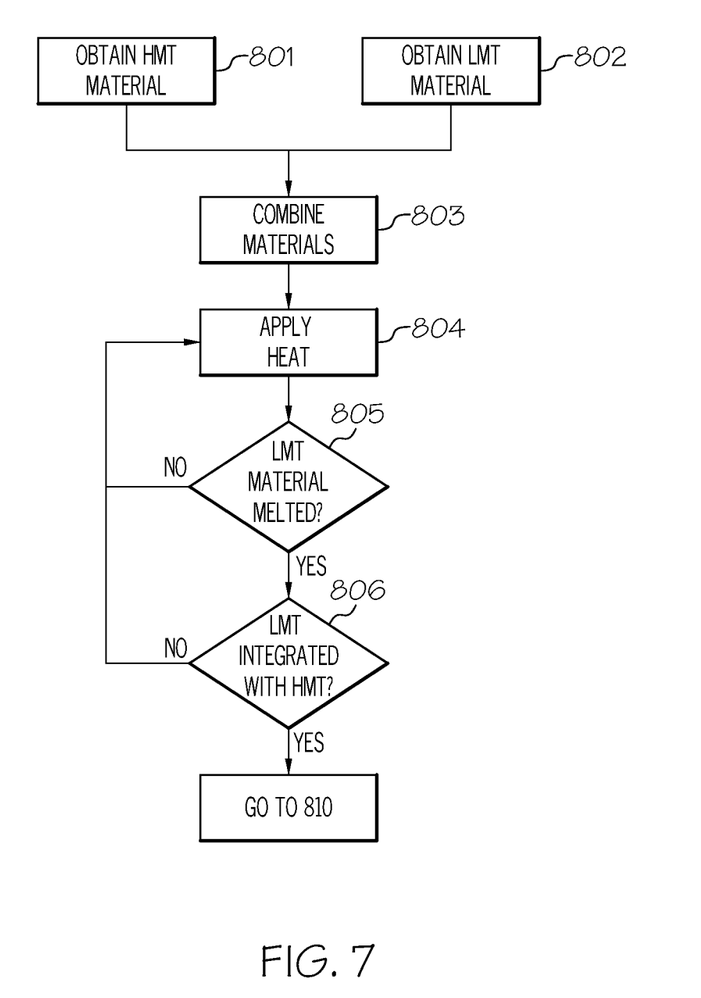
FIG. 7 depicts a flow diagram of an illustrative method of creating a physical bulk sample of a bond layer material according to one or more embodiments shown and described herein.

FIG. 7 depicts an illustrative method of creating a physical sample according to one example. Such a method as described with respect to FIG. 7 may be used, for example, in creating a material used for TLP bonding. The method described with respect to FIG. 7 is merely illustrative and other methods of creating a physical sample are possible and contemplated without departing from the scope of the present application.

The method depicted in FIG. 7 includes manually or automatically obtaining a high melting temperature material in step 801 and obtaining a low melting temperature material in step 802. The terms "high melting temperature" and "low melting temperature" are relative to each other. As such, the high melting temperature material is a material that has a melting point that is higher than the melting point of the low melting temperature material. Similarly, the low melting temperature material is a material that has a melting point that is lower than the melting point of the high melting temperature material. A nonlimiting example of a high melting temperature material may be nickel, which has a melting point of about 1455° C. A nonlimiting example of a low melting temperature material may be tin, which has a melting point of about 231.9° C. Other materials that may be used for the high melting temperature material and the low melting temperature material should be recognized and are included within the scope of the present disclosure. In some embodiments, the high melting temperature material and the low melting temperature material may be obtained together in a pre-mixed mixture, such as, for example, a loose powder or a paste having an organic binder.

In step 803, the high melting temperature material and the low melting temperature material may be manually or automatically combined together. For example, in some embodiments, the high melting temperature material and the low melting temperature material may be mixed together. Because of the respective properties of the materials, it should be understood that in some embodiments, the combination of the materials may not be a homogenous mixture.

In step 804, the combined materials may be heated. The combined materials may be heated until the average internal temperature of the combined materials is at or near the melting point of low melting temperature material, thereby causing the low melting temperature material to melt. For example, in embodiments where the low melting temperature material is tin, the combined materials may be heated such that the average internal temperature of the combined materials is about 231.9° C. While such a temperature will cause the low melting temperature material to melt, it will not cause the high melting temperature material to melt. As such, a determination may be made in step 805 as to whether the low melting temperature material has melted. If the material has not melted, the process may return to step 804 to continue to apply heat. If the material has melted, the process may proceed to step 806.

In step 806, a determination may be made as to whether the low melting temperature material has been integrated with the high melting temperature material. The low melting temperature material may be determined to be integrated with the high melting temperature material if the low melting temperature material has melted in such a way so as to diffuse between particles of the high melting temperature material and form intermetallic compounds between the low melting temperature material and the high melting temperature material. Such a determination may generally include observing the materials to determine whether the intermetallic bonds have been formed. If it has been determined that the low melting temperature material has not been integrated with the high melting temperature material, the process may return to step 804 to continue to apply heat. If the low melting temperature material has been integrated with the high melting temperature material, the process may proceed to step 810 in FIG. 6.

Referring again to FIG. 6, in step 810, the physical sample is imaged with an imaging device, such as an X-ray device. Imaging via X-ray device should generally be understood and therefore is not described in greater detail herein. In some embodiments, imaging may be completed by other devices, including, but not limited to, computer assisted tomography (CAT) scan devices and/or the like. The physical sample may generally be imaged to obtain one or more images thereof, particularly X-ray images where particular visual identifiers (e.g., gray areas) in the X-ray images correspond to various materials used in the physical sample (e.g., gray scales). That is, each visually identifiable area (e.g., gray area) that appears in the X-ray image corresponds to a particular material that is present in the physical sample. For example, if the physical sample contains two types of material (e.g., the low melting temperature material and the high melting temperature material), then the X-ray images will indicate a first material (e.g., the low melting temperature material) in a first visually identifiable format (e.g., one or more first gray areas) and a second material (e.g., the high melting temperature material) in a second visually identifiable format (e.g., one or more second gray areas), where the first visually identifiable format is distinguishable from the second visually identifiable format (e.g., the one or more first gray areas are colored a different shade of gray than the one or more second gray areas). The various visually identifiable formats occur because the different materials absorb different amounts of radiation from the X-ray machine, which is indicated on the resulting images (e.g., a darker shade of gray indicates a material that is less dense and absorbs more radiation).

As a result of imaging the physical sample in step 810, the imaging device generates two dimensional (2D) images of the physical sample in step 820. As described hereinabove, the 2D images generated by the imaging device contains one or more gray areas that correspond to the one or more materials that are present in the physical sample. Thus, in embodiments where the physical sample is made up of a first material and a second material, the 2D images generated by the imaging device will show one or more first gray areas corresponding to the first material and one or more second gray areas corresponding to the second material, where the one or more first gray areas are colored a different shade of gray than the one or more second gray areas.

Figure 8:
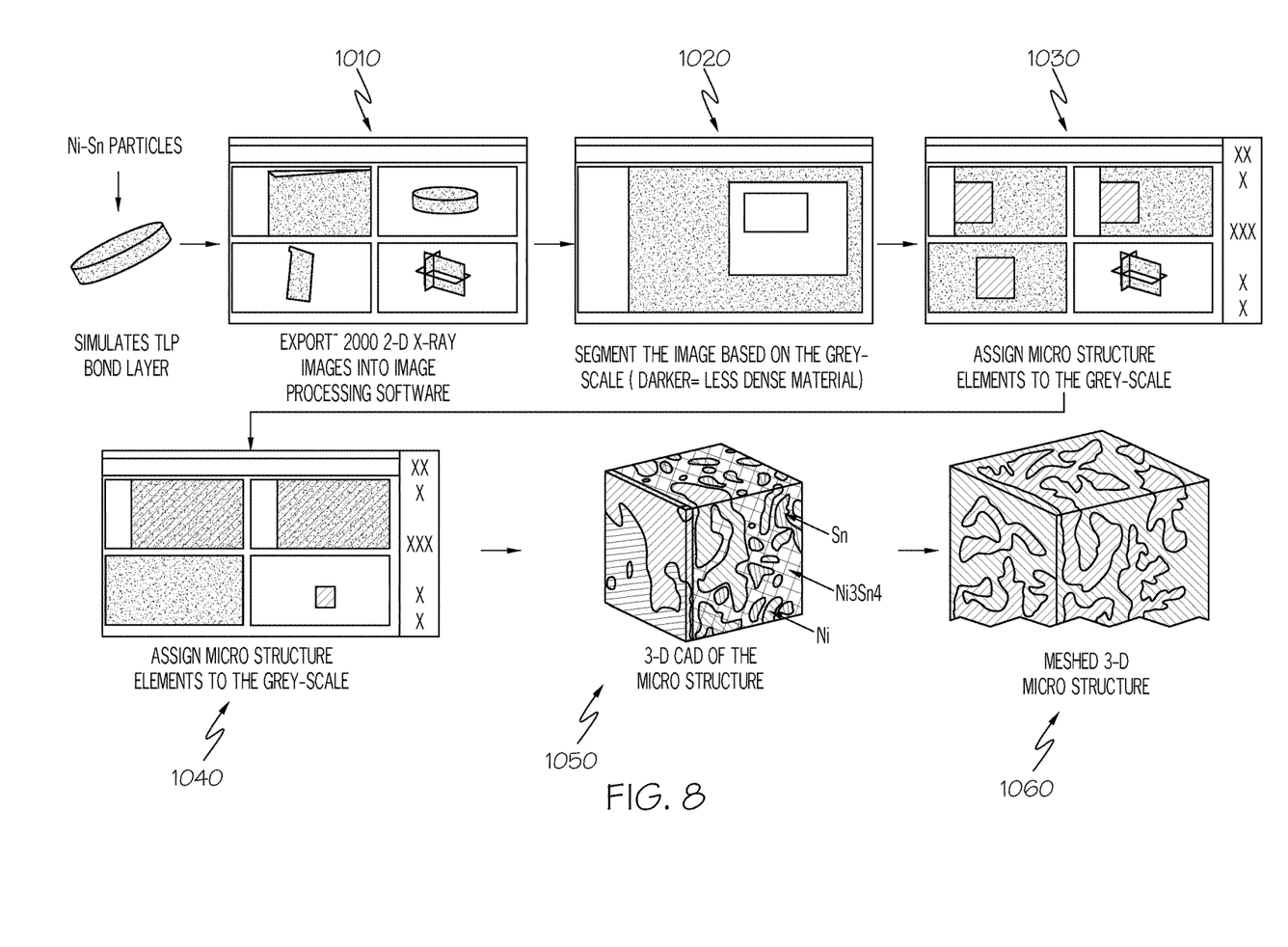
FIG. 8 depicts a flow diagram of an illustrative method of reconstructing a bond layer microstructure as a 3D model according to one or more embodiments shown and described herein.

In step 830, the 2D images that are generated by the imaging device are provided for use by 3D imaging software. As shown in step 1010 in FIG. 8, the 2D images that are generated by the imaging device may include a plurality of 2D X-ray images, each image depicting a different 2D plane of the physical sample. In a nonlimiting example, about 2000 2D X-ray images may be generated. Referring again to FIG. 6, the imaging software may use the 2D images to create a 3D image of the physical sample in step 840. For example, in some embodiments, a digital file for each of the 2D images (such as, for example, DICOM, JPEG, TIFF, BMP, X-ray or raw image data) may be loaded in a memory, and the 3D imaging software (such as, for example, software stored in the creation logic 714 of FIG. 5B) may direct a processing device to access the 2D images from the memory and execute one or more processes to create a 3D image of the physical sample. For example, as shown in step 1020 of FIG. 8, the 3D imaging software may segment the image based on the gray scale (e.g., darker colors in the 2D image indicates less dense material). In addition, referring again to FIG. 6, the 3D imaging software may further direct the processing device to add material system labels to the 3D image of the physical sample so as to identify and locate the various materials present in the physical sample based on the gray scale, as depicted in step 850. The material system labels may include, but are not limited to, labels for materials such as air, tin (Sn), nickel (Ni), nickel-tin intermetallic (e.g., $Ni_3Sn_4$), and/or the like. It should be understood that any software that is capable generating 3D images from 2D images, particularly 3D images from 2D X-ray images, as well as software that can add material system labels to the 3D image, may be used without departing from the scope of the present disclosure. Illustrative software includes, but is not limited to, Mimics® (Materialise N.V., Leuven, Belgium).

In some embodiments, as shown in step 860, the 3D image created by the 3D imaging software may be received from the 3D imaging software. The 3D image may be received in the sense that it is stored in memory (e.g., memory 710 (FIG. 5A)) for use in additional processes as described herein and/or stored in storage (e.g., storage device 750 (FIG. 5A)) for future use.

In step 870, a meshed 3D microstructure-based model may be generated from the 3D image and the material system labels. As particularly shown in FIG. 8, generating a meshed 3D microstructure-based model may include developing a finite element mesh of the geometry of the 3D image (and thus the physical sample) by assigning microstructure elements to the gray scale in step 1030, reconstructing the 3D image in step 1040, creating a 3D computer-aided design (CAD) of the microstructure in step 1050, and creating the meshed 3D microstructure therefrom in step 1060. Additional steps, while not specifically shown in FIG. 8, may include manually or automatically applying material properties based on the material system labels, applying boundary conditions, and applying loads.

The finite element mesh serves as an alternative representation of the 3D model. For finite element meshes composed of 2D or 3D elements embedded in a 3D Euclidean space, the 3D image can be used to simultaneously communicate the structure of the finite element mesh, the surface of the finite element mesh (or geometric model), the scalar magnitude of a solution component, and/or vector solution components. Polygons (such as, for example, triangles) are used to represent the surface of the mesh, line segments are used to represent the boundaries of individual elements (e.g., the components of the physical sample as indicated by the material system labels), color is used to represent the scalar magnitude of the solution component (e.g., temperature), and a vector field or deformed shape is used to represent vector solution components (e.g., displacement).

A graphical result may be obtained by combining a surface rendering with a line segment rendering. The surface rendering is used to represent the mesh surface, a scalar magnitude either representing or derived from a component of the physical sample, and/or a vector field representing vector solution components such as displacement, strain, or the like. The shading is performed by applying one or more shading algorithms. These shading algorithms use as input the geometry of the mesh surface and the color derived from the scalar magnitude of the component of the physical sample. The line segment rendering is generated from the edges of individual finite elements in the finite element mesh. The scalar magnitude of the component may be represented by a single color selected from a banded color map. The banded color map represents a contiguous range of scalar values with a single color. In various embodiments, the final rendering may take one of two forms. One rendering mode, referred to as the iso mode, may be used to represent scalar values attached to nodes and intra-finite element transitions from a color representing one scalar value to a color representing another scalar value. Another rendering mode, referred to as a fringe mode, may be used to represent scalar values attached to 2D faces in the mesh. The fringe mode may use one color corresponding to the scalar value to represent the face.

Referring again to FIG. 6, in step 880, a physical bond layer may be simulated using the 3D microstructure-based model generated in step 870. In some embodiments, the physical bond layer having desired dimensional properties may be simulated. Such a simulation may be completed by any type of simulation software now known or later developed, and is not limited by the present disclosure. In the simulation, loads may be manually or automatically applied to the meshed 3D microstructure-based model to perform a finite element analysis (FEA) test to simulate the physical testing of an actual bond layer. During FEA testing, the 3D microstructure-based model is reduced into a number of finite elements. The finite element reduction is fixed to "ground" at more or more locations to simulate attachment of the physical sample to an interface structure (e.g., the substrate layers). A simulated load or other influence may be applied to the system and the resulting effect is analyzed using conventional mathematical methodologies. Such mathematical methodologies should be recognized and are not described in greater detail herein.

Figure 9:
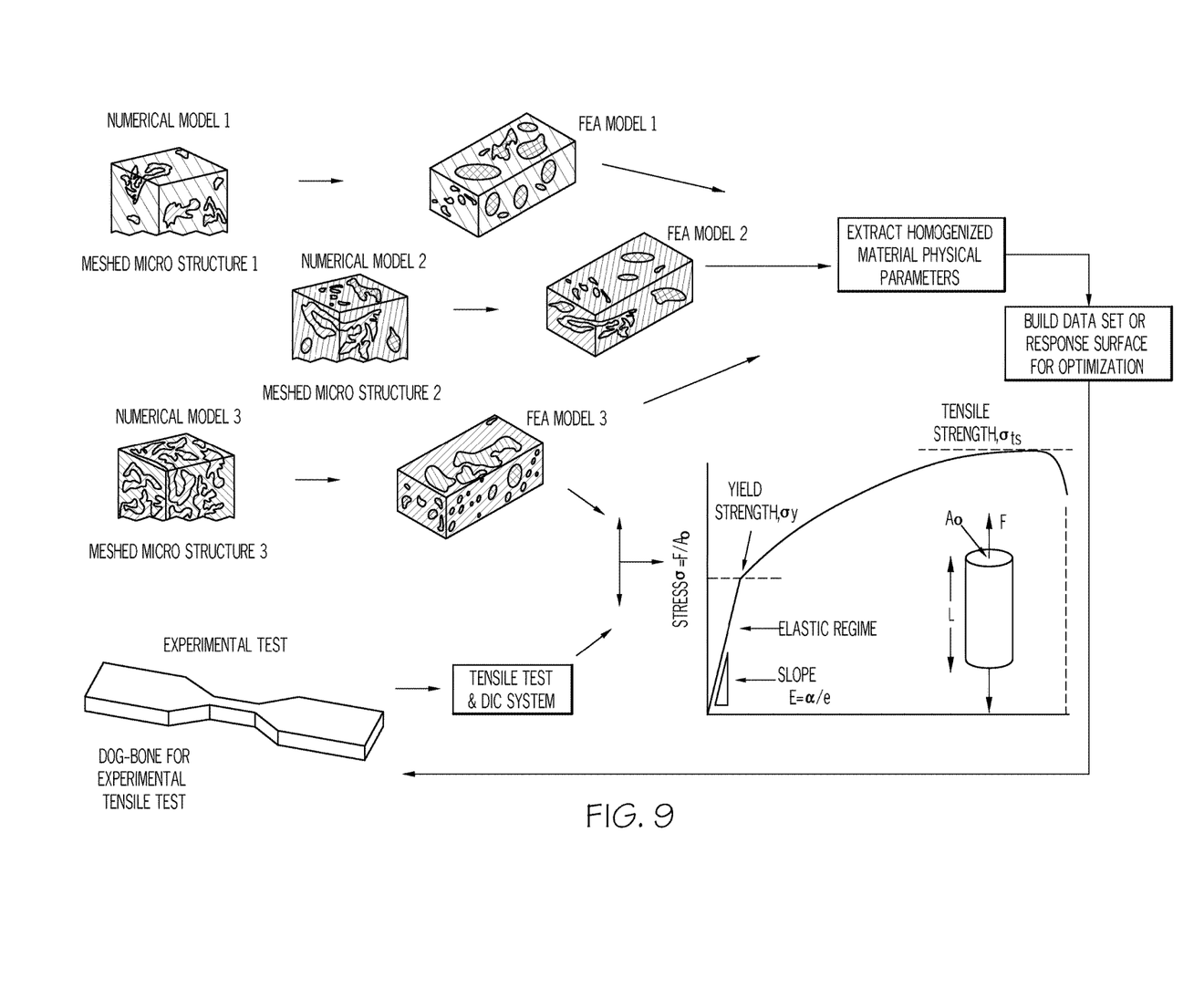
FIG. 9 depicts a flow diagram of an illustrative method of analyzing the microstructure of a bulk sample of a bond layer material according to one or more embodiments shown and described herein.

To ensure the accuracy of the simulation, the experimental results of the simulation may be compared with a physical assembly that uses the physical sample to join a plurality of substrate layers in step 890. The comparison, an example of which is graphically depicted in FIG. 9, allows for a determination of whether the simulation in step 880 is accurate. Particularly, as shown in FIG. 9, one or more numerical models with one or more corresponding meshed micro structures may be translated into one or more FEA models, as described hereinabove with respect to step 870 (FIG. 6). While 3 numerical models are depicted, it should be understood that one or more numerical models may be used. The one or more FEA models may be used to extract homogenized material physical samples. That is, one or more physical sample parameters such as a particular Young's modulus, coefficient of thermal expansion properties, and/or the like, may be selected based upon desired characteristics determined from the FEA models. The parameters may be used to build a data set or a response surface for optimization. The data set may then be compared with a dog bone shaped physical sample that is passed through a tensile testing/digital image correlation (DIC) system such as, for example, the ARAMIS digital image correlation system (Trilion Quality Systems, Plymouth Meeting Pa.). The physical sample may be compared with the experimental results by determining a slope, a yield strength, and/or a tensile strength of each of the physical sample and the experimental results, as depicted by the graph in FIG. 9.

Referring again to FIG. 6, in some embodiments, the physical sample may be optimized to ensure optimum functionality based upon results obtained from the simulation, as shown in step 900. Optimizing the physical sample may include applying one or more optimization algorithms (such as algorithms contained in the optimization logic 718 of FIG. 5B) to determine a composition of the bulk material sample that is optimized for a particular application. Illustrative optimization algorithms that may be applied include, but are not limited to, evolutionary (e.g. genetic) algorithms and gradient-based algorithms are used to fine tune the response of the material microstructure. In addition, in some embodiments, machine learning algorithms trained on prior material data sets may be used to autonomously improve or refine the material design of the physical sample. As a result of such an optimization, the meshed, three dimensional microstructure-based model may be manipulated to create a bond that exhibits particular qualities (e.g., a particular Young's modulus, coefficient of thermal expansion properties, etc.) when applied between two materials, such as between the electronic device 110 and the substrate 120 (FIG. 1). It should be understood that the physical sample may be optimized by manually inputting features (e.g., manually "tweaking" the bond layer) and/or by automatically changing parameters of the bond layer based on the particular application.

While various steps as described herein with respect to FIGS. 6 and 7 are described as being completed by a processing device, it should be understood that certain processes may optionally be manually completed. For example, in some embodiments, the physical sample may be manually created, manually imaged with an imaging device, and manually provided to a computing device for the purposes of creating a 3D image and/or a meshed 3D microstructure-based model. In addition, in some embodiments, comparing the experimental results may be manually compared with the physical sample.

Accordingly, it should now be understood that the systems and methods described herein can be used to simulate various materials that may be used in a physical bond layer between substrate layers in power electronics applications. By obtaining X-ray images of a physical sample and constructing a 3D image and/or a meshed 3D microstructure-based model therefrom, a more accurate simulation of the physical bond layer can be completed, which further reduces the time and expense necessary to evaluate different bond layer compositions and process parameters, and further reduces the need to create large numbers of different physical samples. In addition, the information obtained from the physical samples can be used to optimize the bond layer. That is, the bond layer can be particularly constructed to achieve certain properties based on a particular application.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of simulating a digital representation of a physical bond layer, the method comprising:
creating a bulk physical sample of a composite material usable between an electronic device and a substrate in an assembly;
obtaining one or more X-ray images of the bulk physical sample, the one or more X-ray images comprising one or more visual identifiers that correspond to one or more materials present in the bulk physical sample;
generating a three dimensional image of the bulk physical sample from the one or more X-ray images, wherein the three dimensional image comprises one or more labels indicating the presence and location of the one or more materials;
creating a meshed three dimensional microstructure-based model from the three dimensional image, wherein the meshed three dimensional microstructure-based model incorporates data obtained from the one or more labels; and
simulating the digital representation of the physical bond layer using the meshed three dimensional microstructure-based model.

2. The method of claim 1, wherein creating the bulk physical sample comprises creating the bulk physical sample via solder, Ag sinter, or TLP bonding.

3. The method of claim 1, wherein creating the bulk physical sample comprises:
combining a first material having a high melting temperature with a second material having a low melting temperature to obtain a combination; and
applying heat to the combination such that the combination has an average internal temperature that is greater than a melting point temperature of the first material and less than a melting point temperature of the second material,
wherein applying the heat causes the first material to melt and diffuse between portions of the second material, forming intermetallic compounds between the first material and the second material.

4. The method of claim 1, further comprising predicting one or more properties of the composite material with the simulated digital representation of the physical bond layer.

5. The method of claim 4, further comprising comparing the predicted one or more properties of the composite material with one or more properties of the bulk physical sample.

6. The method of claim 1, wherein simulating the digital representation of the physical bond layer comprises applying a load to the meshed three dimensional microstructure-based model and performing a finite element analysis test to simulate physical testing of the physical bond layer.

7. The method of claim 1, wherein:
generating the three dimensional image comprises generating, by a processing device, the three dimensional image; and
creating the meshed three dimensional microstructure-based model comprises creating, by the processing device, the meshed three dimensional microstructure-based model.

8. The method of claim 1, wherein the one or more visual identifiers are selected from a gray area, a shading, a pattern, a gradient, and a stippling.

9. The method of claim 1, wherein the one or more visual identifiers comprises a first visual identifier corresponding to a first material present in the bulk physical sample and a second visual identifier corresponding to a second material present in the bulk physical sample.

10. The method of claim 1, further comprising optimizing the digital representation of the physical bond layer for a particular application by manipulating the meshed three dimensional microstructure-based model to obtain particular properties of the physical bond layer.

11. The method of claim 1, further comprising constructing the physical bond layer for use between the electronic device and the substrate in the assembly such that the physical bond layer binds the electronic device and the substrate and exhibits the particular properties.

12. A system for optimizing a digital representation of a physical bond layer comprising a composite material from a bulk physical sample of the composite material that is usable between an electronic device and a substrate in an assembly, the system comprising:
a processing device; and
a non-transitory, processor readable storage medium, the non-transitory, processor readable storage medium comprising one or more programming instructions stored thereon that, when executed by the processing device, cause the processing device to:
obtain one or more X-ray images of a bulk physical sample of the composite material, the one or more X-ray images comprising one or more visual identifiers that correspond to one or more materials present in the bulk physical sample;
generate a three dimensional image of the bulk physical sample from the one or more X-ray images, wherein the three dimensional image comprises one or more labels indicating the presence and location of the one or more materials;
create a meshed three dimensional microstructure-based model from the three dimensional image, wherein the meshed three dimensional microstructure-based model incorporates data obtained from the one or more labels;
simulate the digital representation of the physical bond layer using the meshed three dimensional microstructure-based model; and
optimize the digital representation of the physical bond layer for a particular application by manipulating the meshed three dimensional microstructure-based model to obtain particular properties of the physical bond layer.

13. The system of claim 12, wherein the non-transitory, processor readable storage medium further comprises one or more programming instructions stored thereon that, when executed by the processing device, cause the processing device to:
predict one or more properties of the composite material with the simulated digital representation of the physical bond layer.

14. The system of claim 13, wherein the non-transitory, processor readable storage medium further comprises one or more programming instructions stored thereon that, when executed by the processing device, cause the processing device to:
compare the predicted one or more properties of the composite material with one or more properties of the bulk physical sample.

15. The system of claim 12, wherein the one or more programming instructions that, when executed by the processing device, cause the processing device to simulate the digital representation of the physical bond layer further cause the processing device to:
  apply a load to the meshed three dimensional microstructure-based model; and
  perform a finite element analysis test to simulate physical testing of the physical bond layer.

16. The system of claim 12, wherein the one or more programming instructions that, when executed by the processing device, cause the processing device to obtain one or more X-ray images further cause the processing device to electronically receive the one or more X-ray images via a user input.

17. The system of claim 12, wherein the one or more programming instructions that, when executed by the processing device, cause the processing device to obtain one or more X-ray images further cause the processing device to electronically receive the one or more X-ray images from an X-ray device.

18. The system of claim 12, wherein the one or more programming instructions that, when executed by the processing device, cause the processing device to optimize the digital representation of the physical bond layer further cause the processing device to:
  apply one or more optimization algorithms to the digital representation of the physical bond layer to determine a composition of the bulk physical sample that has one or more of a particular Young's modulus and a particular coefficient of thermal expansion property for the particular application.

19. A method for predicting one or more properties of a composite material, the method comprising:
  creating a bulk physical sample of the composite material that is usable between an electronic device and a substrate in an assembly;
  arranging the bulk physical sample at an X-ray machine such that the X-ray machine generates one or more X-ray images of the bulk physical sample, the one or more X-ray images comprising one or more visual identifiers that correspond to one or more materials present in the bulk physical sample;
  generating a three dimensional image of the bulk physical sample from the one or more X-ray images, wherein the three dimensional image comprises one or more labels indicating the presence and location of the one or more materials;
  creating a meshed three dimensional microstructure-based model from the three dimensional image, wherein the meshed three dimensional microstructure-based model incorporates data obtained from the one or more labels;
  simulating a digital representation of a physical bond layer using the meshed three dimensional microstructure-based model;
  predicting the one or more properties of the composite material with the simulated digital representation of the physical bond layer; and
  optimizing the digital representation of the physical bond layer for a particular application by using the meshed three dimensional microstructure-based model to obtain particular properties of the physical bond layer.

20. The method of claim 19, wherein creating the bulk physical sample comprises:
  combining a first material having a high melting temperature with a second material having a low melting temperature to obtain a combination; and
  applying heat to the combination such that the combination has an average internal temperature that is greater than a melting point temperature of the first material and less than a melting point temperature of the second material,
wherein applying the heat causes the first material to melt and diffuse between portions of the second material, forming intermetallic compounds between the first material and the second material.

* * * * *